US012792403B2

(12) United States Patent
Vasileiadis et al.

(10) Patent No.: US 12,792,403 B2
(45) Date of Patent: Nov. 10, 2026

(54) WORKFLOW MEMOIZATION TO REUSE RESULTS OF PAST WORKFLOW INSTANCES

(71) Applicant: International Business Machines Corporation, Armonk, NY (US)

(72) Inventors: Vasileios Vasileiadis, Dublin (IE); Michael Johnston, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 17/199,608

(22) Filed: Mar. 12, 2021

(65) Prior Publication Data

US 2022/0291964 A1 Sep. 15, 2022

(51) Int. Cl.
*G06N 5/048* (2023.01)
*G06F 9/50* (2006.01)

(52) U.S. Cl.
CPC ........... *G06F 9/5027* (2013.01); *G06N 5/048* (2013.01)

(58) Field of Classification Search
CPC .............................. G06F 9/5027; G06N 5/048
See application file for complete search history.

(56) References Cited

U.S. PATENT DOCUMENTS

| | | | |
|---|---|---|---|
| 6,553,394 B1 | 4/2003 | Perry et al. | |
| 8,108,848 B2 | 1/2012 | Meijer et al. | |
| 8,335,773 B2 | 12/2012 | Balko et al. | |
| 8,656,378 B2 | 2/2014 | Gounares et al. | |
| 8,752,021 B2 | 6/2014 | Li et al. | |
| 8,789,030 B2 | 7/2014 | Gounares et al. | |
| 8,839,204 B2 | 9/2014 | Gounares et al. | |
| 9,037,798 B2 | 5/2015 | Lysko | |
| 9,076,240 B2 | 7/2015 | Khalvati et al. | |
| 9,658,851 B2 | 5/2017 | Keramidas et al. | |
| 9,946,576 B2 | 4/2018 | van Velzen et al. | |
| 10,055,578 B1 * | 8/2018 | Marquardt | G06F 21/44 |
| 10,395,181 B2 | 8/2019 | Bowers et al. | |
| 10,572,822 B2 | 2/2020 | Aharonov et al. | |

(Continued)

FOREIGN PATENT DOCUMENTS

WO WO-2007010100 A2 * 1/2007 ............... G06N 5/02

OTHER PUBLICATIONS

Francois et al., WO2007010100A2 Description Translation, Jan. 25, 2007, <https://worldwide.espacenet.com/publicationDetails/description?CC=WO&NR=2007010100A2&KC=A2&FT=D&ND=3&date=20070125&DB=&locale=en_EP>, pp. 1-46 (Year: 2007).*

(Continued)

*Primary Examiner* — April Y Blair
*Assistant Examiner* — Hsing Chun Lin
(74) *Attorney, Agent, or Firm* — Scully, Scott, Murphy & Presser P.C.; Kristofer Haggerty

(57) ABSTRACT

Workflow memoization can include generating an embedding associated with a node in a workflow. The embedding can be generated by encoding at least the node's executable and input data to the node. A matching embedding can be retrieved from a database of embeddings, which matches the generated embedding according to a match criterion. The database of embeddings can store embeddings associated with previously run nodes. Output data associated with the matching embedding can be retrieved. The output data can be used as the node's output without having to run the node in the workflow.

25 Claims, 12 Drawing Sheets

(56) References Cited

U.S. PATENT DOCUMENTS

| | | | | |
|---|---|---|---|---|
| 10,776,269 | B2 | 9/2020 | Li et al. | |
| 2011/0067030 | A1* | 3/2011 | Isard | G06F 8/433<br>718/102 |
| 2018/0081717 | A1* | 3/2018 | Li | G06Q 10/06 |
| 2018/0218153 | A1* | 8/2018 | Edwards | G06F 21/566 |
| 2022/0206816 | A1* | 6/2022 | Soundararajan | G06F 9/3836 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

Lee, W., et al., "Dynamic Tracing: Memoization of Task Graphs for Dynamic Task-Based Runtimes", SC18, Nov. 11-16, 2018, 13 pages.

Zhang, G., et al., "Leveraging Hardware Caches for Memoization", IEEE Computer Architecture Letters, Jan.-Jun. 2018, pp. 59-63, vol. 17, No. 1.

Tziantzioulis, G., et al., "Temporal Approximate Function Memoization", IEEE Micro, Jul./Aug. 2018, pp. 60-70.

Github, "Step level memoization", argoproj/argo-workflows, Issue #944, https://github.com/argoproj/argo/issues/944, Aug. 9, 2018, Accessed on Mar. 12, 2021, 10 pages.

Sevenbridges, "About Memoization (WorkReuse)", https://docs.sevenbridges.com/docs/about-memoization, Updated Sep. 2020, Accessed on Mar. 12, 2021, 4 pages.

* cited by examiner

WORKFLOW MEMOIZATION TO REUSE RESULTS OF PAST WORKFLOW INSTANCES

BACKGROUND

The present application relates generally to computers and computer applications, and more particularly to work flow and job scheduling in computer processors and systems.

Large scale, complex computational workflows tend to evolve over time. A developer, or a team of developers, may start from small project (e.g., a pipeline of components) and iteratively refine this pipeline by adding, removing, and modifying nodes of the workflow. While iteratively working with a workflow in a test/analyze/improve loop can become a routine process, unless there is a mechanism to intelligently reuse the results of past workflow instances, there could be repetitions or redundancies in running a process over and over thereby wasting compute resources.

It is also often the case that groups working in the same organization build workflows that use the same tools and the same data, which can provide opportunities for data reuse. However, unless there is support by the workflow orchestrator or scheduler, it is up to the users to first find out that they can reuse past results and then manually modify their workflows for the same. This not only creates additional overhead but also another source of errors.

BRIEF SUMMARY

The summary of the disclosure is given to aid understanding of a computer system, computer architectural structure, processor, workflow memoization, and method of thereof, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, processor, workflow memoization, and/or their method of operation to achieve different effects.

In an aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow.

In another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The output data can be retrieved from a storage storing output files and data associated with the embeddings in the database.

In yet another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The match criterion can include identical matching.

In still another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The match criterion can include fuzzy matching based on a configurable similarity threshold.

In yet still another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The embedding can be generated recursively.

In another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The embedding can include encoding of the node's metadata with the node's executable and the node's input.

In yet another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The embedding can include encoding of the node's metadata with the node's executable and the node's input. The node's metadata can include at least one of container image name, container image hash and environment variables.

In still another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The output data can be retrieved from a remote storage.

In another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The output data can be retrieved from a local storage.

In another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The method can also include authenticating a process that is retrieving the output data for security.

In another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. Outputs of multiple cached tasks with matching embeddings can be retrieved and filtered based on a filter criterion.

In another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The output data can be further post-processed before using the output data in lieu of running the node.

In yet another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The output data can be associated with a node from a different workflow different from the workflow.

In still another aspect, a computer-implemented method can be provided for workflow memoization. The method can include generating an embedding associated with a node in a workflow. The embedding can be generated by encoding at least the node's executable and input data to the node. The method can also include retrieving from a database of embeddings, a matching embedding that matches the generated embedding according to a match criterion, the database of embeddings storing embeddings associated with previously run nodes. The method can also include retrieving output data associated with the matching embedding. The output data can be used as the node's output without having to run the node in the workflow. The output data can include intermediary files and output files, which the node would create if the node were to be run on a processor.

In still yet another aspect, a computer-implemented method can include generating a memoization embedding associated with a node in a workflow. The method can also include retrieving from a database of embeddings, a matching embedding that matches the generated embedding according to a match criterion, the database of embeddings storing embeddings associated with previously run nodes. The method can further include retrieving output data associated with the matching embedding, the output data for use as the node's output without having to run the node in the workflow.

A system including at least one hardware processor configured to perform one or more methods described herein can also be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
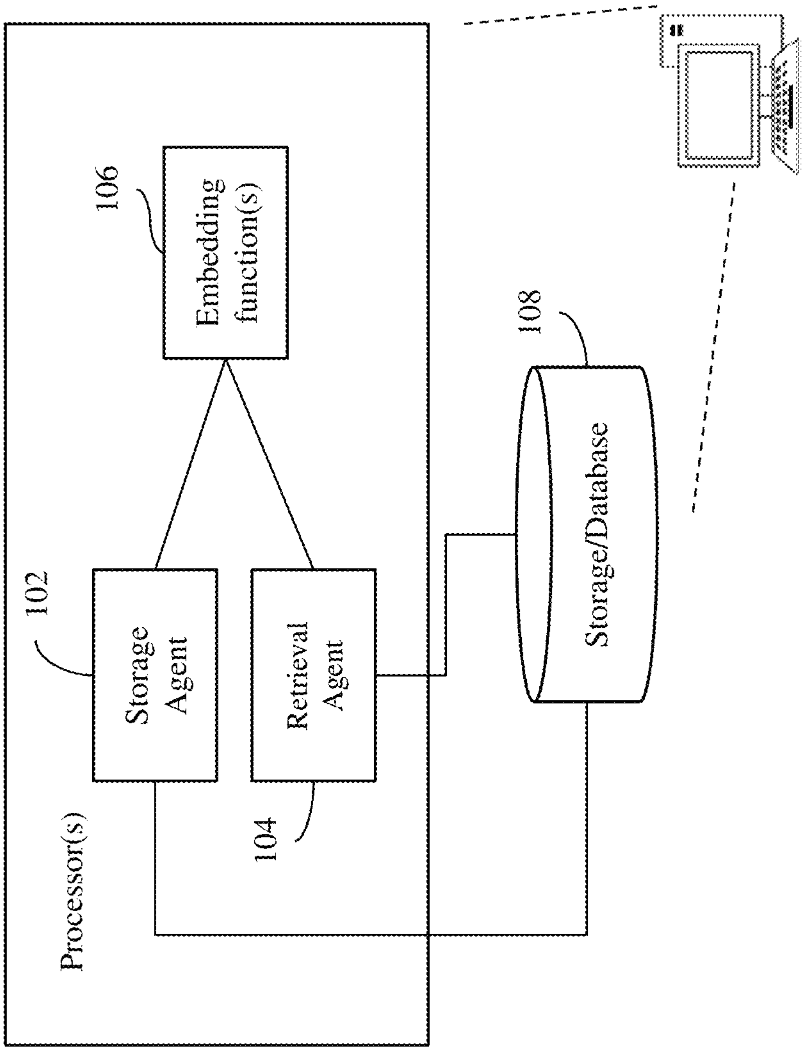
FIG. 1 is a diagram illustrating components of a system for memoization in an embodiment.

In one or more embodiments, one or more systems and methods of workflow memoization can be provided. The following terms are referred to in the description herein.

Workflow can be represented in a directed acyclic graph. For example, the nodes of the directed acyclic graph can represent applications or services, and edges connecting the nodes can indicate dependencies between the nodes.

Node is a workflow node which may be an application or service.

Workflow developer can refer to a person or algorithm (e.g., an automated entity), which implements a workflow.

Workflow user can be a person or algorithm (e.g., an automated entity), which executes a workflow. In an aspect, a workflow user need not be familiar with the internals of the workflow. For instance, a workflow user can treat a workflow as a black box.

Task refers to an execution of an application or service.

Configuration of node refers to information that defines the behavior of a node and its task(s). Examples of configuration can include, but not limited to, executable, one or more arguments to the executable, container image, one or more environment variables, one or more file dependencies, one or more input dependencies to other nodes, one or more backend options (e.g., queue, cluster selectors, etc), metadata to improve scheduling, error detection and correction, etc.

Node instance refers to a combination of a configuration of a node and the information for all the tasks the node generated.

Workflow orchestrator or manager refers to framework that interprets the configuration of a workflow and its nodes to create, manage, and monitor nodes.

Workflow scheduler can receive instructions from the workflow orchestrator or manager and handle the scheduling, management, and monitoring of tasks.

Memoization refers to an act of associating inputs to a function (e.g., a task) with the generated outputs of the function. For example, when the inputs to the function match a set of inputs that has been used before, instead of executing the function from scratch, the cached outputs can be returned.

Strong memoization. A function (e.g., task) call can be memoized (e.g., reuse past outputs instead of executing it) if the memoization mechanism expects that the would-be outputs of the function to be identical to those that have been cached in the past for an identical set of inputs.

Fuzzy or weak memoization. The memoization mechanism relaxes its memoization conditions so that a function call is memoized even if its outputs are not expected to be identical but rather have some level of similarity with the outputs of a cached function call.

Hash-function refers to a function which generates a string from some input that can act as a signature. Hash-function can be used to hide inputs and produce compressed representation.

Embedding refers to a vector of hash-function outputs. Embedding can be of size 1.

In one or more embodiments, workflow memoization can reduce the computation time, and resource consumption, of workflows by caching the results of tasks and reusing them, e.g., should the task be invoked with identical inputs (strong memoization) or similar enough ones (fuzzy memoization).

In one or more embodiments, a method can be provided to generate memoization embeddings for a task based on its configuration and its inputs (e.g., file paths, file contents, text, environment variables, etc).

In an aspect, the systems and/or methods disclosed herein may minimize running of expensive computations on computer processors, and/or running processes redundantly, thereby providing improvements in computer resource usage such as memory and processing power usage, and also improving speed of the workflow execution.

In one or more embodiments, a method can be provided to record memoization embeddings in a database. In one or more embodiments, a method can be provided to query existing memoization embeddings to find items that match the memoization embedding of a task that is ready to execute (e.g., its input and data dependencies are satisfied). If at least one matching item is returned, a returned result can be used instead of executing the task. The method in an embodiment can address both strong and fuzzy memoization. In one or more embodiments, a method can be provided to support memoization for workflows that have been executed on remote platforms (e.g., on cloud computing environments such as but not limited to hybrid cloud).

In one or more embodiments, systems, methods and techniques can provide a solution to existing pain points of using memoization with workflows. At the same time, in one or more embodiments, the systems, methods and techniques can provide users with the necessary functionality to include custom logic in the memoization process (e.g., fuzzy memoization).

In an embodiment, the systems, methods and techniques can address memoization at the level of entire programs, for example, at the granularity of workflows. A greedy scheduler, for example, can memoize sub-graphs of workflows, which in turn, can include multiple interconnected programs. Memoization can include reusing, for example, the intermediate results and/or outputs of past workflow instances. In an embodiment, workflow memoization uses information from instantiated tasks of workflow nodes. In an embodiment, a system and/or method can completely automate the process of workflow memoization while also giving the option to users to tailor the memoization embeddings to their needs. In an embodiment, a system and/or method can support memoization even in cases where tasks read and/or write folders. In an embodiment, a system and/or method can support fuzzy memoization, which for example, can allow workflow developers to dynamically determine whether the tasks of their workflows are memoized. For instance, the system does not force workflow users to switch off memoization.

In an embodiment, the systems, methods can provide for workflow memoization which can be designed with scalability, for instance, with low memoization overhead. A system, for example, can process a node configuration and its inputs to generate one or more embeddings (e.g., strings) that represent a node and its tasks. For example, a system can provide support for custom functions to generate memoization embeddings. Nodes may be tagged with one or more memoization embedding. In an embodiment, a search of compatible cached tasks can be performed by a database backend. Two tasks, two nodes, or a node and a task, A and B, can be considered compatible, or matching, if at least one memoization embedding of the one or more memoization embeddings of A matches one or more of the one or more memoization embeddings of B. In the context of strong memoization, two memoization embeddings match if they are identical. In the context of fuzzy memoization two memoization embeddings match if a memoization embeddings matching function, which can be user provided, computes that the two memoization embeddings match. For example, an embodiment of a memoization embeddings matching function can declare that two memoization embeddings match only if their bitstreams are at least 99% percent, or some other percentage threshold, equal. A cached task is one that (a) has been executed, (b) whose execution outputs are stored in a storage location and (c) whose memoization embedding along with other relevant metadata, e.g., location of the cached outputs, is stored in the database. For instance, databases are usually optimized for string querying. A system can support fuzzy memoization with similarity threshold. A single button or interface can be provided, which can allow workflow users to use strong memoization and fuzzy memoization. Outputs or post-processed files can be used for memoization of task. A system can enable workflow developers to tailor workflow memoization to their needs, support hybrid cloud (e.g., memoize across cluster or cloud computing boundaries), and/or support data security and user isolation.

FIG. 1 is a diagram illustrating components of a system for memoization in an embodiment. A system can include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a system for memoization can include a database 108 for storing node-embeddings. The term "memoization agent" can refer to a storage agent or retrieval agent, or both. A memoization storage agent (also referred to as a storage agent) 102 can apply a configurable memoization embedding function 106 to a workflow node or workflow nodes and store the embeddings to a database 108. A memoization retrieval agent (also referred to as a retrieval agent) 104 can apply a configurable memoization embedding function 106 to a workflow node or workflow nodes and retrieve a list of matching tasks from the database 108. In an embodiment, a memoization embedding function includes one or more mapping functions that work together to generate a memoization embedding for a node. In an embodiment, the memoization embedding function can be configurable in that the workflow developer or another user can provide their own implementation of one or more mapping functions. In an embodiment, the storage agent 102 and retrieval agent 104 may be implemented as a single memoization agent or separate agents. The term "memoization agent" can refer to a storage agent or retrieval agent, or both. In an embodiment, the storage and retrieval steps or processing can occur at the same time or in some configurable order.

In an embodiment, a method can be provided for generating memoization embeddings of a node using its configuration and/or producers. The method can be implemented or run on one or more computer processors, for example, including one or more hardware processors. One or more mapping functions 106 can convert arbitrary inputs to a stream of bits. The terms "embedding function", "node embedding function" and "memoization embedding function" are used interchangeably herein. In an embodiment, a node embedding function, which can be configurable, may used a mapping function to generate its output. In an embodiment, a node embedding function, which can be configurable, may use multiple mapping functions to generate its output. This can be useful as each mapping function may extract information about one or more aspects of a node. The node embedding function may then combine all of this information to generate its final output. For example, one mapping function may produce sensible output by processing the command line (executable and arguments) of a node. Another example of a mapping function may generate output based on the producer nodes of a target node (i.e., nodes whose output the target node consumes). A "producer node" is also referred to as an "upstream node." A "consumer node" is also referred to as a "downstream node.

In an embodiment, the method and/or system can provide recursive capability. In this context, recursion can refer to executing a mapping function with some arguments leads to the function executing itself at least one more time with the same or different arguments. For instance, the function could be returning some data about the target node for which an embedding is being generated. The method can also execute or run the same function on the producer nodes of the target. The method can then combine all this information to generate the memoization embedding of the target. Consider, for example, that each node may have zero or more producer and zero or more consumer nodes. These are also referred to as inbound and outbound nodes respectively. A producer node is a node whose outputs are consumed by a consumer node. The "target node" referred to above is also a consumer of all its producer nodes. In an embodiment, recursive node embedding functionality or capability can be provided, which can generate a feature-vector for a node that is suitable for memoization, for example, by applying one or more mapping functions to the node configuration. The node configuration may include, for example, executable, command-line, environment variables, and/or container image. For instance, one or more, or all of such node configuration can be used to generate an embedding for memoization, e.g., a memoization embedding. The recursive node embedding functionality can also use node embeddings of the node's producers (e.g., recursion). For example, a node's memoization embedding can be created by starting at the node and walking or traversing the graph upstream from it, applying the embedding function at each node visited on the walk, and then combining the outputs of the executions of the embedding function.

In an embodiment, the recursive node embedding functionality can also include information regarding the input to the node, for example the hashes of the input files. In an embodiment, the node embedding function, as well as the mapping function(s) that the node memoization embedding functionality applies are configurable. A node may be tagged with one or more memoization embeddings.

In an embodiment, the memoization agent(s) 102, 104 can use the node embedding functions 106. In an embodiment, the retrieval agent 104 can use a similarity threshold to filter matching nodes.

In an embodiment, the retrieval agent 104 can retrieve files, generated by cached task entries, from local storage and/or remote storage (e.g., shown at 108). In an embodiment, there can be multiple retrieval agents, for example, a retrieval agent retrieving from a local storage, another retrieval agent retrieving from a remote storage.

A workflow scheduler can be provided that can reuse retrieved files of cached tasks to memoize another task. For example, a workflow scheduler may memoize entire subgraphs of workflows by applying a method in a greedy way. In an embodiment, a system may post-process the files of one or more cached tasks after they have been retrieved and before they are used to memoize a task. In an embodiment, a system can provide for data security and user isolation in the context of workflow memoization.

In an embodiment, the task(s) that are used to memoize a task in the active workflow instance do not need to come from an instance of the same workflow definition, although they may even come from the same workflow instance.

In an embodiment, there can be an embedding function for strong memoization and another embedding function for fuzzy memoization. A node, and its tasks, may be tagged with any number of embeddings. The description herein uses the terms "memoization embedding of node" and "memoization embedding of task" interchangeably.

A method in an embodiment can include generating a memoization embedding suitable for strong memoization. It can be observed that a node applies its transformation logic (as defined by its configuration) to generate some output which may in turn be read by one or more consumer nodes. A method can combine the information of the node configuration with that of its input artifacts (e.g., files, folders, bitstreams) to generate memoization embedding(s) for a task. Embeddings characterizes a task and can be considered as a task signature.

In an embodiment, an embedding function 106 does not require the outputs of the node so that it can be generated immediately. It can be observed that hashes of the outputs of the node are included in the embeddings of its consumer nodes.

In an embodiment, an algorithm of an embedding function 106 may generate, for example, one or more of the following, and concatenate them to form a single bitstring or a table with descriptive headers (such as "executable_path", "executable_metadata", "arguments", "metadata-image", "metadata-environment-variable-$NAME", etc), for example, as an embedding or memoization embedding:

- Path to executable;
- Executable metadata, for example, but not limited to, executable version, hash of the executable, interpreter version;
- Argument string where references to data generated by input nodes, and/or references to inputs to the workflow instance, can be replaced by:
  - memoization embeddings for references to working directory of producer nodes, one-way deterministic hashes of data for references to files and/or bitstreams, and/or
  - memoization embedding of producer node concatenated by the path to folder for references to folders that are generated by a producer node;
- Execution metadata, for example, but not limited to, container image name, container image hash, environment variables. In an aspect, the embedding or memoization embedding can represent a dictionary that identifies or describes (in an encoding) what the node is doing.

In an embodiment, automatic fuzzy workflow memoization can be provided. In an embodiment, fuzzy memoization memoizes a task T using a cached task which is similar to and/or compatible with T but not necessarily identical. A method encodes the node configuration and the node inputs to generate a fuzzy memoization embedding for a task.

- An algorithm of an embedding function which may be used for fuzzy memoization may generate, for example, one or more of the following, and concatenate them to form a single bitstring or a table with descriptive headers (such as "executable_path", "executable_metadata", "arguments", "metadata-image", "metadata-environment-variable-$NAME", etc), for example, as an embedding or memoization embedding, or fuzzy memoization embedding:
- Path to executable;
- Executable metadata, for example, but not limited to, executable version, hash of the executable, interpreter version;
- Argument string where references to data generated by input nodes, and/or references to inputs to the workflow instance, can be replaced by: Memoization embeddings for references to working directory of producer nodes, one-way deterministic hashes of data for references to files and/or bitstreams that are not produced by a node in the graph, and/or memoization embedding of producer node concatenated by the path, or identifier of the output, for outputs that are generated by a producer node;

Execution metadata, for example, but not limited to, container image name, container image hash, environment variables. In an aspect, the fuzzy embedding or fuzzy memoization embedding can represent a dictionary that identifies or describes (in an encoding) what the node is doing. A task can be annotated with multiple fuzzy memoization embeddings. For example, a task may have multiple functionalities or features; as a result it can have one or more fuzzy memoization embeddings that describes the task with respect to its one or more functionalities or features.

In an embodiment, a memoization agent, e.g., retrieval agent 104 generates embedding(s) for a task, interacts with a database containing metadata for tasks, can filter a list of cached tasks, and pick the fittest candidate for memoization out of a list of cached tasks. What is fittest can be determined on one or more criteria, which can be configurable.

In an embodiment, a storage agent 102 applies embedding-function(s) 106 to node configuration and inputs to generate one or more memoization embedding(s). For example, one could be suitable for strong memoization and another for more relaxed, fuzzy memoization. In an embodiment, a storage agent 102 can insert metadata include memoization embedding(s) to a centralized database. This process can handle asynchronously (e.g., a memoization agent, e.g., a storage agent 102, can be running as an independent entity to the workflow orchestrator and scheduler entities).

In an embodiment, a retrieval agent 104 can perform the following retrieval process. For example, the retrieval agent 104 applies memoization embedding function(s) to generate one or more memoization embedding(s) for a node. The retrieval agent 104 queries the database 108 using the memoization embedding(s) to get a list of cached tasks that can be used to memoize the outputs of current task. In an embodiment, the retrieval agent 104 may optionally, discard returned cached tasks which are no longer valid or are inaccessible. In an embodiment, if there are more than one remaining cached tasks, the memoization agent (e.g., the retrieval agent 104) may select the fittest one. For example, the fittest one can be determined as the most recent one. Other methods can be applied to select a fittest cached task.

In an embodiment, a memoization agent may only retrieve the outputs of a cached task T to memoize a node N if there is at least one consumer of node N which is not memoized. This is because the results of such a node is guaranteed to be consumed by one of the consumer nodes.

In another embodiment, each time a cached task T is reused to memoize a node N, the system may only retrieve those outputs of T that are referenced by the consumers of N.

In another embodiment, a cached task T may only be retrieved if the memoization agent determines that memoizing a node N is better than executing it. For example, the memoization agent may estimate the execution time of a component before it executes it and only perform memoization if it is quicker than executing the node from scratch. By way of example, the execution time of a node can be determined by examining the metadata of similar cached tasks which are stored in the database.

Figure 2:
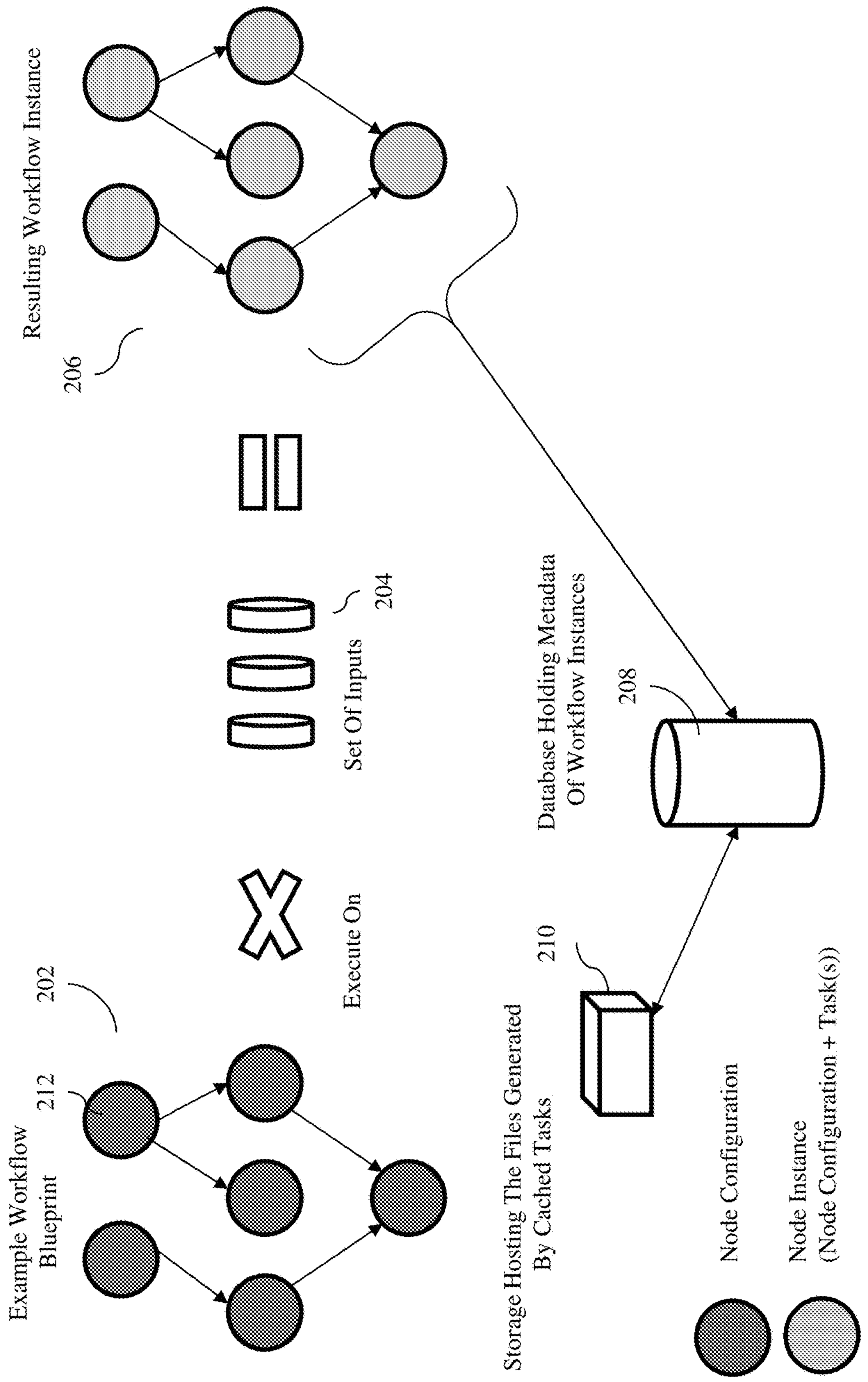
FIG. 2 is a diagram illustrating components and/or a process of populating a database with memoization entries in an embodiment.

FIG. 2 is a diagram illustrating components and/or a process of populating a database with memoization entries in an embodiment. A workflow blueprint 202 can include one or more nodes (e.g., 212) representing applications and/or services, which are connected based on their workflow order or relationship. For example, a workflow blueprint 202 can specify a number of applications and/or services that can be run. In an embodiment, using a workflow blueprint or specification 202, a user such as a developer may use a workflow orchestrator to run the workflow for a set of inputs 204, resulting in a workflow instance 206. A storage agent, for example, can insert metadata of finished nodes 206, for example, including memoization embeddings into a database 208. In an embodiment, the storage agent and/or retrieval agent can be implemented as part of a daemon process (e.g., background process in an operating system), which asynchronously can observe the process of the workflow instance 206. The database 208, for example, can hold or store metatdata of workflow instances. The database 208 can also hold for example the metadata of cached tasks. The metadata of a cached task may include the memoization embedding along with other relevant metadata, e.g., location of the cached outputs. In an embodiment, there can be another storage 210 hosting the files or data generated by cached tasks (e.g., output of the task). In an embodiment, the database 208 can also hold files or data generated by cached tasks.

Figure 3:
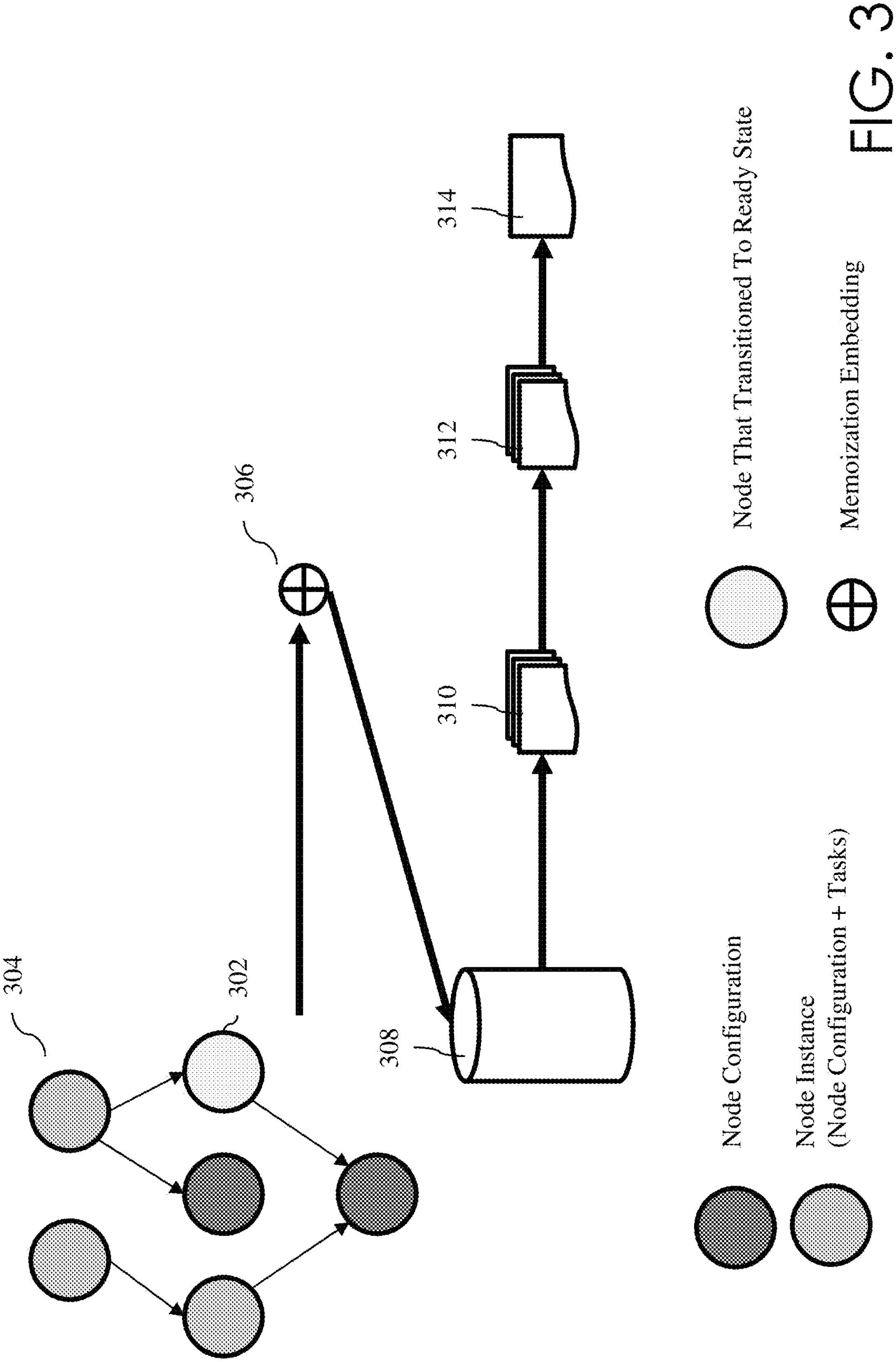
FIG. 3 is a diagram illustrating components and/or a process of querying database for list of memoization candidates in an embodiment.

FIG. 3 is a diagram illustrating components and/or a process of querying database for list of memoization candidates in an embodiment. In an embodiment, for example, a storage agent can generate one or more memoization embeddings of a task 302 in a workflow instance 304. For example, this generating can be triggered by an entity such as a workflow scheduler, whenever the scheduler identifies that a node transitions into the ready state (e.g., all the node's dependencies to other nodes and files are satisfied). At 306, a retrieval agent, for example, can query a database 308, which for example, holds metadata of workflow instances, for a list of cached tasks with a matching memoization embedding(s), for example, those that match the memoization embedding of the node transitioned to ready state. The database 308 returns a list of cached tasks 310 with a matching memoization embedding. In an embodiment, a retrieval agent may filter out invalid and/or inaccessible memoization candidates. For example, item at 312 illustrates cached tasks remaining after filtering. In an embodiment, a retrieval agent may pick or select one memoization candidate 314.

In an embodiment, a system can provide memoization with custom node embedding function or functions. For example, the system may enable workflow developers to implement custom fuzzy memoization embedding generators. This can be useful for programs that are difficult to automatically capture their transformation logic and/or the essence of their input/output bitstreams and/or folders. One example of such category of tools is non-deterministic programs.

In an embodiment, workflow developers and/or users can be allowed to augment the configuration of nodes so that tasks are tagged with custom-generated fuzzy memoization embeddings. For example, a node configuration is augmented to allow for an optional new field which holds a function implemented in a programming language (e.g., Python, JavaScript, C, etc). In an embodiment, this function receives parameters that are populated by a memoization agent (e.g., storage agent and/or retrieval agent) for a task T of a node. It returns a memoization embedding for the task T. By way of example, the arguments to the function, among others, can include the node information and the information (e.g., all the information, or one or more of the information)

the embedding function (e.g., algorithm of an embedding function) described above with reference to 106 in FIG. 1, to generate embeddings. The memoization agent (e.g., storage agent and/or retrieval agent) may also read the contents of input files to the task and provide them to the function. In an embodiment, the memoization agent invokes the function above in a safe and secure way (using any of the known methods for running untrusted code) and treats the return value as the fuzzy memoization embedding of task T. The function may return multiple fuzzy memoization embeddings for T. A memoization agent can be a storage agent and/or retrieval agent, for example, depending on the context.

In an embodiment, a system for memoization can support automatic fuzzy memoization with similarity threshold. In an embodiment, the similarity threshold involves memoization embeddings which support a pairwise similarity check. A similarity check function may be a value in the range [0.0, 1.0]. The extreme values 0.0 and 1.0 may indicate that the two tasks are completely different and identical, respectively. Simpler similarity check functions may return a Boolean about whether two memoization embeddings are "similar enough", for example, based on a predefined threshold, for one of them to be used in memoizing the other. A simple example of a similarity function can include comparison of characters or bits of the memoization information (e.g., metadata and/or others) associated with a cached task and a current task. Other functions can be implemented for determining similarity. A similarity check function can be configurable, for example, provided by a workflow developer or user.

For example, a workflow developer or user may provide a function to compute similarity between two memoization embeddings. The function may be in the form of a source code or an executable. The function may also be provided as a parameter to a workflow orchestrator or be part of the node configuration. In an embodiment, the workflow developer or user may provide a similarity threshold to the memoization agent (e.g., a storage agent and/or retrieval agent), for example, as a configurable parameter. In an embodiment, if such similarity threshold is not configured, for example, by a user, the memoization agent can use a default value. This value is referred to herein as SimilarityThreshold, by way of example. The SimilarityThreshold option may be part of node configuration or even provided to the workflow scheduler at run time. When the memoization agent searches for cached tasks which can be used to memoize a task T, the memoization can use the SimilarityThreshold and the return value of the similarity function to build a list of "similar-enough" memoization candidates. The memoization agent can pick one of the items in the list (e.g., the most similar one) and use it as the cached task for the memoization of T.

In an embodiment, a retrieval agent can retrieve cached files from local storage. In an embodiment, the retrieval agent can be used by other entities, such as a workflow scheduler, to create copies of files associated with a cached task. These files can be stored in one or more local storage locations. The retrieval agent, upon request, can make a copy of the files associated with a cached task and store them under a directory.

In an embodiment, a remote retrieval agent can be provided, which retrieves cached files from remote storage. Such an embodiment can allow workflow memoization functions on a cloud computing environment, for example, but not limited to, hybrid cloud. In an embodiment, the remote retrieval agent can be used by other entities, such as the workflow scheduler, to create copies of files associated with a cached task. These files can be stored in one or more remote storage locations. The retrieval agent, upon request, can make a copy of the files associated with a cached task and store them under a directory. In an embodiment, when retrieving a remote file, the retrieval agent can interact with the database to discover a workflow instance gateway that has access to the files. In an embodiment, the retrieval agent can interact with a workflow instance gateway daemon that has access to the remote files. In an embodiment, the retrieval agent can store the copies of the files under a directory that is local to the remote retrieval agent. In another embodiment, the retrieval agent can copy the files under a directory that is local to a workflow instance gateway daemon by interacting with the workflow instance gateway daemon.

In an embodiment, a workflow scheduler or the like can reuse a cached task to memoize a task. For example, the workflow scheduler can avoid executing a task T by memoizing it, e.g., using the files (e.g., output) associated with one or more cached tasks that are compatible with T. In an embodiment, for example, the workflow scheduler or the like can invoke a memoization agent to generate memoization embedding(s) for task T, and/or discover and filter cached tasks which are compatible with T. In an embodiment, for example, the workflow scheduler or the like may use a retrieval agent to fetch files associated a cached task that are stored in one or more local storage locations. In an embodiment, for example, the workflow scheduler or the like may use a remote retrieval agent to fetch files associated with a cached task that are stored in one or more remote storage locations. In an embodiment, for example, the workflow scheduler or the like can populate the files of task T using the files that were retrieved, for example, from one or more of the local storage locations and/or the remote storage locations. In an embodiment, for example, the workflow scheduler or the like can mark the end of the memoization of task T by tagging it as finished.

Figure 4:
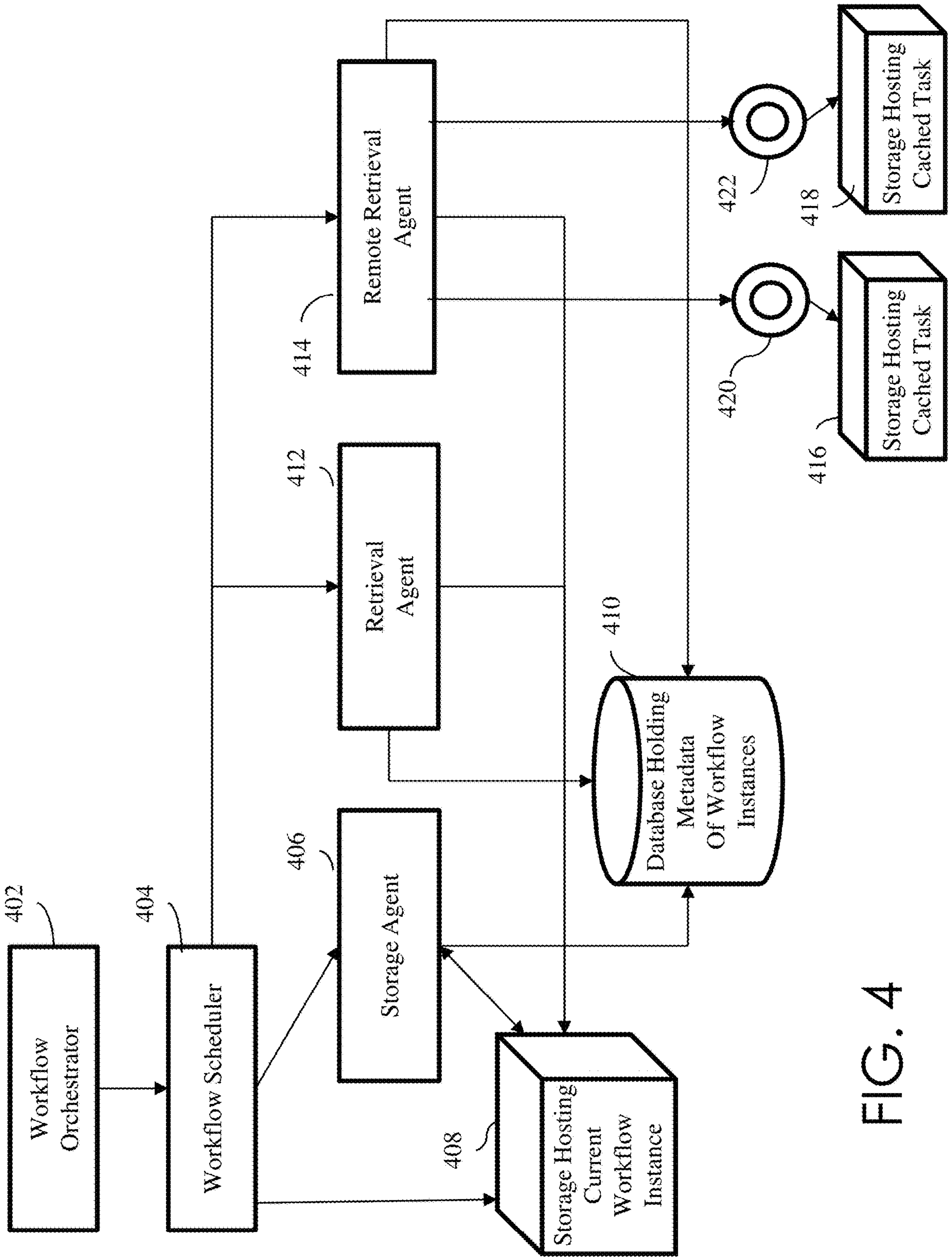
FIG. 4 is a diagram illustrating components and/or a process of memoization, for example, using a cached task to memoize a task and/or populating a database with metadata, in an embodiment.

FIG. 4 is a diagram illustrating components and/or process of using a cached task to memoize a task in an embodiment. The components include computer-implemented components and processes. A workflow orchestrator 402 or the like can interpret the configuration of a workflow and its nodes. A workflow scheduler 404 or the like can receive instructions from the workflow orchestrator 402 and identify that a node is transitioning into ready state. For example, that node is ready to run. A workflow scheduler 404 or the like can reuse a cached task to memoize a task. The workflow scheduler 404, for example, can trigger a storage agent 406 to generate one or more memoization embeddings of a task associated with or corresponding to the node. For example, the workflow scheduler 404 may access a storage 408 hosting current workflow instance and identify that a task is transitioning into ready state. The storage agent 406 may retrieve information associated with the task and generate one or more memoization. Such information can include, but is not limited to, executable of the task (e.g., path to executable), input to the task, metadata associated with the task. For example, such information can be stored in a database 410 that hold metadata of workflow instances. For example, the storage agent 406 may query the database 410 using information from the storage 408 hosting current workflow instance to retrieve the information (e.g., executable, input, metadata) about the task from the database 410 to generate one or more memoization embedding. The generated memoization embedding along with the rest of the task metadata can be stored in the database 410. A retrieval agent 412 can query the database 410 to find one or more task metadata with matching memoization embeddings. The database 410 can return a list of cached task metadata with a matching memoization embedding of the current task. The outputs of cached tasks, which can be files or data, can be stored in a storage hosting cached tasks. In an embodiment a retrieval agent (e.g., 412 and/or 414) can filter out invalid and/or inaccessible memoization candidates, and select one memoization candidate. In an embodiment, the database 410 can hold metadata associated with workflow instances and metadata associated with cached tasks. The metadata of, or associated with, a cached task also can include one or more memoization embeddings of that task. Storage 416, 418 can be a hard drive, or a so-called StorageBucket, or any other kind of a storage option. In an embodiment, the storage 416, 418 can hold all the outputs that a cached task generated. For example, they can be the working directory of a program including the entire file structure of the directory.

In an embodiment, for example, if a storage hosting files of cached tasks 416, 418 is located remotely, a remote retrieval agent 414 may store or retrieve remote files of cached tasks. For example, remote retrieval agent 414 can be triggered to retrieve or obtain files of a cached task that matches the generated embedding. For instance, such remote retrieval agent can interact with a workflow instance gateway daemon that has access to the remote files. There can be at least one pair of gateway (420) and storage (416) per cluster. A gateway can be used for a remote cluster to access the files in the storage location to which the gateway provides access. For example, a remote retrieval agent 414 can access a remote storage hosting files of cached tasks 416, 418, via one or more workflow instance gateways 420, 422. In an embodiment, one or more workflow instance gateways 420, 422 act as access points for the workflow instances and/or files of cached tasks 416, 418 and/or cached tasks, stored in a particular remote location, for example, cloud or cluster instance.

Figure 5:
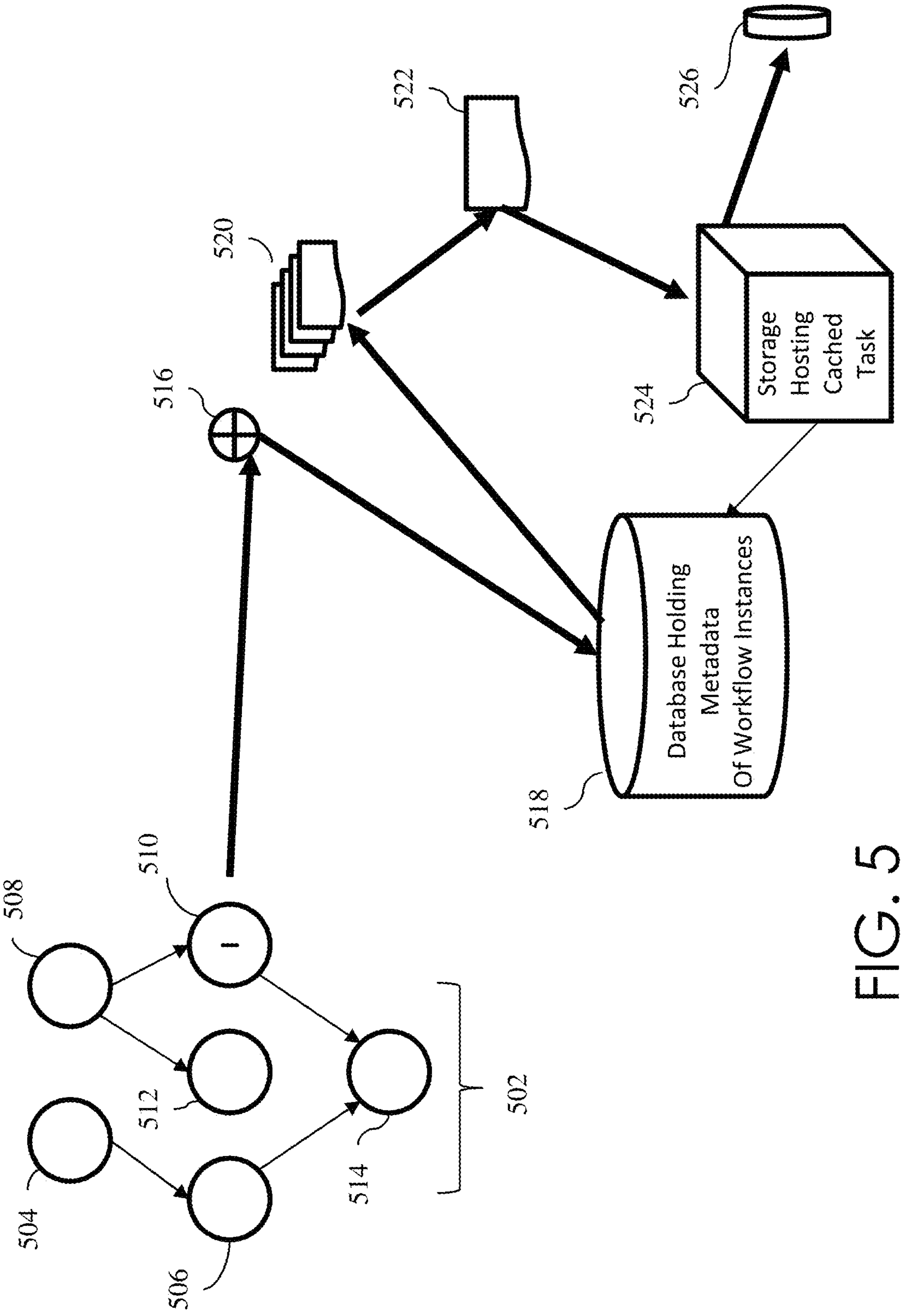
FIG. 5 is a diagram illustrating file retrieval agent retrieving one or more cached files associated with a cached task from local storage in an embodiment.

FIG. 5 is a diagram illustrating memoization agent working with cached files from local storage in an embodiment. A state of a workflow instance 502 may include nodes instances (e.g., that have been run or completed, e.g., possibly memoized) 504, 506, 508, a node that transitioned into ready state 510, and node configurations (e.g., those that need to be run as part of the workflow, but not yet) 512, 514. A memoization agent herein refers to storage and/or retrieval agent. A memoization agent generates one or more memoization embedding(s) of a task associated with the node that transitioned into ready state 510 (e.g., all ready to run, its dependencies have been satisfied, for example, via a parent node 508 having run or completed) using data associated with this node or task retrieved from a database 518 holding metadata of workflow instances. For example, at 516, memoization embedding can occur. In an embodiment, the generated memoization can also be stored in a database, for example, the same database 518 that stores the metadata and/or another database. In an embodiment, the memoization agent queries the database 518 for cached tasks with a matching memoization embedding. The database 518 can return a list of cached tasks 520 with matching memoization embedding. In an embodiment, the memoization agent may filter the list and select a best memoization candidate 522, for example, based on one or more criteria. The memoization agent may copy the files of the cached task, e.g., the output of the task, from local storage 524. A workflow scheduler may use the cached task 526 to memoize the task node (I) 510, and may mark the memoized task 510 as finished.

Figure 6:
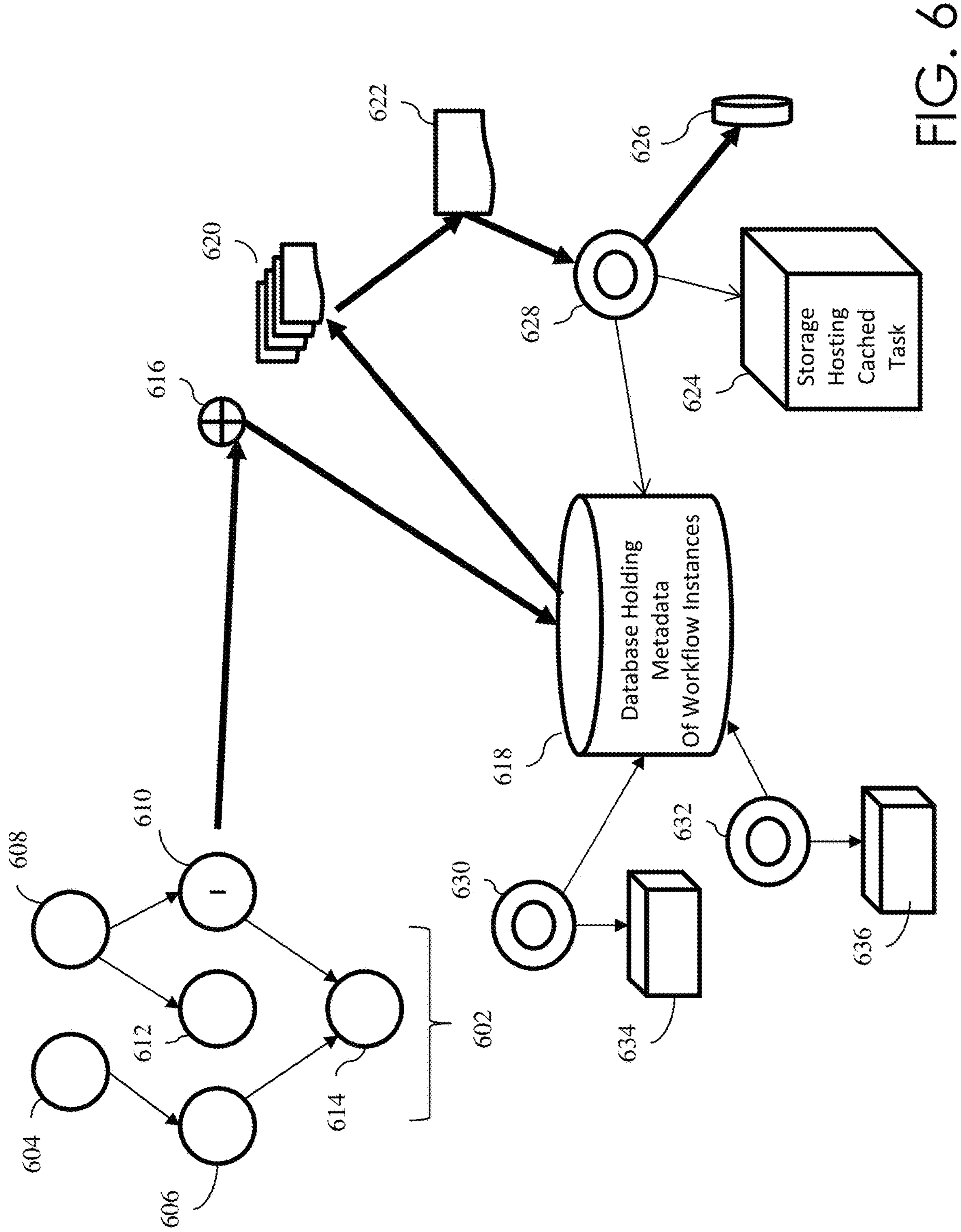
FIG. 6 is a diagram illustrating file retrieval agent retrieving one or more cached files associated with a cached task from remote storage in an embodiment.

FIG. 6 is a diagram illustrating memoization agent working with cached files from remote storage in an embodiment. A state of a workflow instance 602 may include nodes instances (e.g., that have been run or completed, e.g., possibly memoized) 604, 606, 608, a node that transitioned into ready state 610, and node configurations (e.g., those that need to be run as part of the workflow, but not yet) 612, 614. A memoization agent herein refers to storage and/or retrieval agent. A memoization agent generates one or more memoization embedding(s) of a task associated with the node that transitioned into ready state 610 (e.g., all ready to run, its dependencies have been satisfied, for example, via a parent node 608 having run or completed) using data associated with this node or task retrieved from a database 618 holding metadata of workflow instances. For example, at 616, memoization embedding can occur. In an embodiment, the generated memoization can also be stored in a database, for example, the same database 618 that stores the metadata and/or another database. In an embodiment, the memoization agent queries the database 618 for cached tasks with a matching memoization embedding. The database 618 can return a list of cached tasks 620 with matching memoization embedding. In an embodiment, the memoization agent may filter the list and select a best memoization candidate 622, for example, based on one or more criteria. The memoization agent can download the files of the cached task from the appropriate workflow instance gateway 628, 630, 632, which has access to storages 624, 634, 636. A workflow scheduler may use the cached task 626 to memoize the task node (I) 610, and may mark the memoized task 610 as finished.

A system and/or method in an embodiment can post-process files of cached task or tasks after retrieving them but before memoizing a task, e.g., the current task. There can be scenarios, for example, in the case of fuzzy-memoization, where the files generated by one or more matching cached tasks can be further improved before using them to memoize a task. In another aspect, the files associated with multiple cached tasks can be combined before the merged and post-processed files are used for memoization.

A node configuration may include a new field for an executable and/or a new field for a function body defined in some programming language which can be compiled or interpreted. A memoization agent can invoke the executable and/or the function. The memoization agent can provide to the executable and/or the function, the copies of the files of the cached tasks. The memoization agent may also provide the node configuration as a parameter to the executable and/or function. The executable and/or function can then post-process the copies of the files of the cached tasks. The workflow scheduler can use the files generated by the executable and/or function to complete the memoization of a task.

Figure 7:
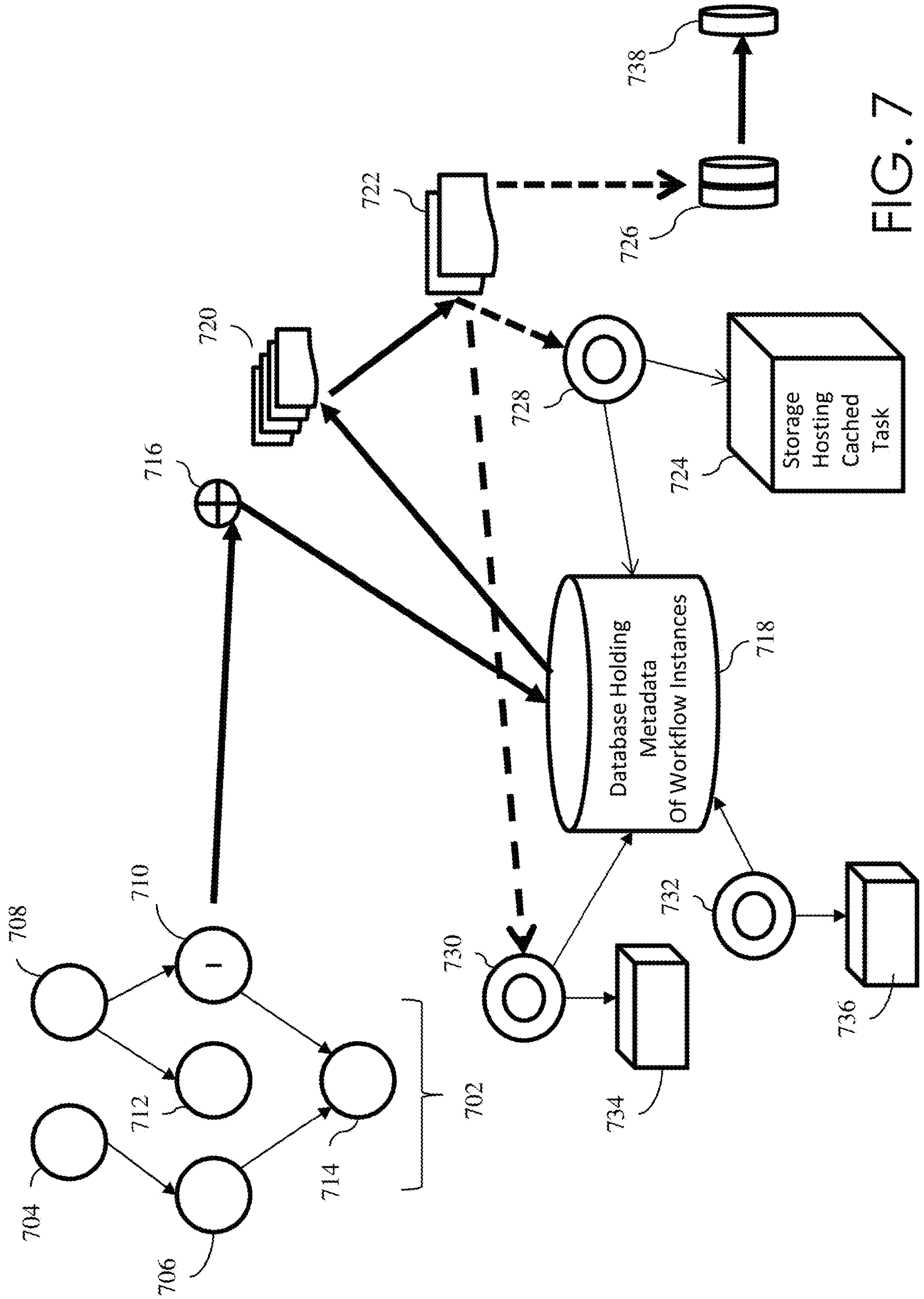
FIG. 7 is a diagram illustrating post-processing of files of cached task or tasks in an embodiment.

FIG. 7 is a diagram illustrating post-processing of files of cached task or tasks in an embodiment. For example, the post-processing can occur after retrieving the files but before they are used in memoizing a task. A state of a workflow instance 702 may include nodes instances (e.g., that have been run or completed, e.g., possibly memoized) 704, 706, 708, a node that transitioned into ready state 710, and node configurations (e.g., those that need to be run as part of the workflow, but not yet) 712, 714. A memoization agent herein refers to storage and/or retrieval agent. A memoization agent generates one or more memoization embedding(s) of a task associated with the node that transitioned into ready state 710 (e.g., all ready to run, its dependencies have been satisfied, for example, via a parent node 708 having run or completed) using data associated with this node or task retrieved from a database 718 holding metadata of workflow instances. For example, at 616, memoization embedding can occur. In an embodiment, the generated memoization can also be stored in a database, for example, the same database 718 that stores the metadata and/or another database. In an embodiment, the memoization agent queries the database 718 for cached tasks with a matching memoization embedding. The database 718 can return a list of cached tasks 720 with matching memoization embedding. In an embodiment, the memoization agent may filter the list and select a best memoization candidate 722, for example, based on one or more criteria. There can be one or more best memoization candidates. The memoization agent can fetch the files of the cached task from the appropriate workflow instance gateway 728, 730, 732, which has access to storages 724, 734, 736, and/or from local storage. A post-process function (or executable) merges or post-processes retrieved candidate file or files 726 into a file 738 to use in memoization. A workflow scheduler may use the post-processed file 738 to memoize the task node (I) 710, and may mark the memoized task 710 as finished.

In an embodiment, the system and/or method can provide for data security and workflow user isolation. The data security and user isolation can provide for security in working with data via cloud instances and/or in data sharing processes. In an embodiment, the memoization embeddings of a task can be encrypted so that even if a foreign identity views the memoization embeddings they cannot reconstruct the node configuration or associated input bitstreams. A task can contain metadata to control the set of users which are authorized to re-use instances of the task for memoization. This can be implemented or provided in multiple ways. For example, the node configuration can contain a field which specifies which groups of users have access to the cached instances of the node's tasks. As another example, the entire workflow definition may define the groups of users that have access to the cached task instances of the workflow nodes. As yet another example, the input dataset can be tagged with authorization metadata which the workflow scheduler uses to automatically tag the tasks of nodes.

In an embodiment, workflow users may log in the database or an identification authority to retrieve a token. The workflow users may then provide this token to the memoization agent. In turn, the memoization agent can use the token to authenticate against the database so that the memoization agent may query the database. Each workflow user account can contain a set of tags which indicate, among other things, the clearance level of the user and the set of data-lakes/workflow-gateways/workflow-instances/workflow-nodes that the user has access to. The database can filter out query results for which the user does not have access to. In an embodiment, transactions with the database can be encrypted (e.g. via a Transport Layer Security (TLS), a protocol to encrypt communication data, e.g., internet traffic).

Example use cases:

In an example, a discovery computing platform, e.g., which can be built on a cloud computing environment, e.g., on hybrid-cloud, can implement a workflow memoization disclosed herein in various embodiments. An example area is materials discovery. In this context, it is beneficial for researchers to be able to use memoization, which for example can improve computer performance, and computer resource usage. In the context of machine learning, workflow memoization can be used to speed up the process of generating model ensembles, among other scenarios. Workflow memoization is a way to make use of compute resources which exist in multiple clusters/cloud-instances (e.g., hybrid cloud). Workflow memoization on the hybrid cloud can also be used to schedule tasks in remote platforms, wait for their termination, and then fetch their outputs via surrogate nodes.

In an aspect, every time a workflow user makes progress with one of their workflow instances, every other user who has access to the same database can automatically get the benefit of using the outputs, and intermediate files, of the same workflow instances. In this way, workflow users can accelerate their work. Workflow users can have a chance to collaborate without having to explicitly ask each other for help, for example, all they would need may be to point or configure their workflow scheduler to the same database. Workflow users can make more efficient use of their compute resources. A task that runs to completion once does not have to be re-run again.

The system and/or method disclosed herein can support hybrid cloud environment, which in turn enables workflow users to reduce the cost of running large scale computational workflows. They can run heavy workloads on expensive to operate platforms. Workflow users can also have a choice of selecting a cheaper albeit less performant platform to run workflows that use memoization to perform additional computations on the cached tasks. The system and/or method can provide an advantage to run possibly expensive computations once, and then re-use them multiple times but at a lower cost.

In an embodiment, a node in a workflow can have more than one task or application. In an embodiment, a memoization embedding can be created for an entirety of the applications or tasks of a node. In another embodiment, a node can have multiple embeddings. A cached task of a node can be reused to memoize another node if at least one of the one or more memoization embeddings of the first node matches one or more of the one or more memoization embeddings of the second node. A matching task embedding need not be from the same workflow or workflow configuration. For example, a memoization of a task from a workflow can be used to memoize a task in another or different workflow instance having different workflow configuration. For instance, memoization disclose herein can reuse the intermediate results and outputs of past workflow instances. In an embodiment, a system and/or method disclosed herein can completely automate the process of workflow memoization while also giving the option to users to tailor or customize the memoization embeddings to their needs. In an embodiment, a system and/or method disclosed herein can support memoization in tasks which have folders as inputs or outputs, for example, read and/or write from/to folders. In an embodiment, a system and/or method disclosed herein can provide fuzzy memoization, which lets workflow developers to dynamically determine whether the tasks of their workflows are memoized. For example, the system and/or method need not force workflow users to switch off memoization.

A system and/or method disclosed herein can generate embeddings of a function or program in a recursive way. In an embodiment, a recursive memoization embedding functions leverage the transformation logic of pipelines of programs. In return, the system, for example, may reduce the overhead of generating memoization embeddings for node X by reusing the memoization embeddings that have been computed for producer nodes of X. A recursive memoization can also enable memoization of entire sub-graphs of workflows without the need for a complicated graph-matching algorithm. An embodiment of a system and/or method can include using information of a node's producers in the memoization embedding of the node. Another embodiment can apply the memoization embedding function recursively. The recursive process can, for example, involve starting at the node and walking or traversing the graph upstream from it, applying the embedding function at each node visited on the walk.

In an aspect, a multi/hybrid cloud/cluster environment can be leveraged during memoization. For example, a system can memoize tasks of workflow nodes by re-using results that were computed on, potentially costly to operate, remote hardware. This can enable efficient utilization of compute resources.

In an aspect, a user authentication and/or authorization mechanism can propagate the security/authorization metadata of inputs and outputs of workflow nodes. This way, for example, when the workflow instance of a workflow user reuses cached result to memoize one of its workflow nodes, the workflow user can be authorized to reuse the cached results.

In an aspect, fuzzy memoization allows users to reuse cached results which have been computed by a slightly different computation and/or are the aggregation of multiple cached computations. A system, for example, can function to generate memoization embeddings suitable for fuzzy memoization (which can also be user-configurable), support for similarity-threshold matching during the process of looking up cached function/program results, provide post-processing of cached results and aggregation of cached results. A memoization approach disclosed herein can improve the performance of workflows which have been partially executed before, and it can also be used to generate new results.

Figure 8:
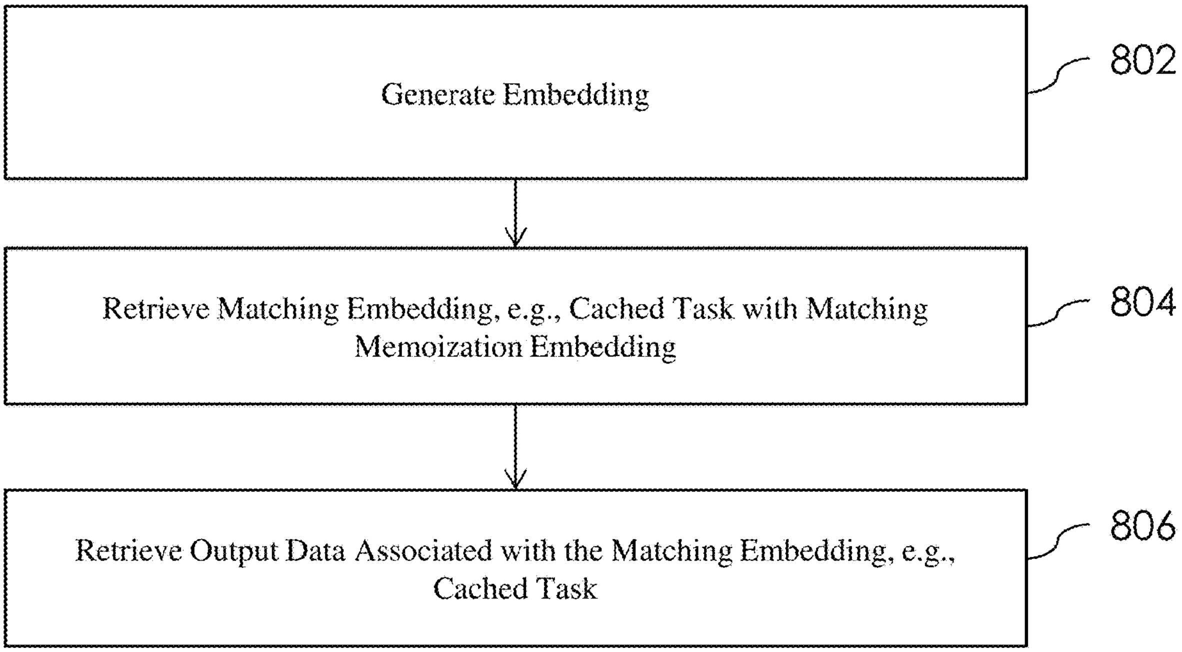
FIG. 8 is a flow diagram illustrating a method of memoization in an embodiment.

FIG. 8 is a flow diagram illustrating a method of memoization in an embodiment. The method can be implemented or run on one or more computer processors, for instance, including one or more hardware processors. At 802, an embedding is generated associated with a node in a workflow. The embedding can be generated by encoding at least, but not limited to, the node's executable and input data to the node. For example, in various embodiments, the embedding can be generated by encoding one or more combinations of characteristics of the node, for example, data associated with node configuration, executable path, executable metadata, its producers, inputs to the node, e.g., arguments or argument strings to the node and/or its producers or functions, other metadata such as runtime metadata, for example, but not limited to, container image name, container image hash and environment variables, and/or other information or configuration associated with the node.

At 804, a matching embedding can be retrieved from a database of embeddings, which matches the generated embedding according to a match criterion. The database of embeddings can store embeddings associated with previously run nodes, for example, which can be from the same workflow configuration or different workflow configuration. In an embodiment, the match criterion can include identical matching. In another embodiment, the match criterion can include fuzzy matching based on a configurable similarity threshold.

At 806, output data associated with the matching embedding can be retrieved, the output data for use as the node's output without having to run the node in the workflow. For example, the next process in the workflow can use the output data as its input, without having to run the node on computer processor. This can save computer resources, and improve computer system usage and performance.

In an embodiment, the output data can be retrieved from a storage storing output files associated with the embeddings in the database. In an embodiment, the output data can include intermediary files and output files, which the node would create if the node were to be run on a processor.

In an embodiment, the embedding can be generated recursively from the node. For example, the embedding can be generated by starting at the node and walking the graph upstream from it, applying the embedding function at each node visited on the walk.

In an embodiment, the output data can be retrieved from a remote storage. In another embodiment, the output data can be retrieved from a local storage. In another embodiment, the output data can be retrieved from both the local and remote storage.

The method can also include authenticating a process or a user that is retrieving the output data, for example, to provide security. In an embodiment, there can be an authentication or log-in procedure for authenticating users that can perform memoization.

In an embodiment, multiple matching embeddings can be retrieved and filtered based on a filter criterion. There can be one or more filtered matching embeddings.

In an embodiment, the output data can be further post-processed before using the output data in lieu of running the node. In an embodiment, multiple matching embeddings can be retrieved and outputs associated with the multiple matching embeddings can be post-processed to generate the output data before using the output data in lieu of running the node.

In another aspect, a computer-implemented method can be provided which can include generating a memoization embedding associated with a node in a workflow. A memoization embedding, for example, can be generated using one or more data associated with the node such as one or more of node configurations of the node and/or other data. The method can also include retrieving from a database of embeddings, a matching embedding that matches the generated embedding according to a match criterion, the database of embeddings storing embeddings associated with previously run nodes. The method can further include retrieving output data associated with the matching embedding. The output data can be used as the node's output without having to run the node in the workflow. For instance, a workflow process may automatically use the output data without running the node in running the workflow.

Figure 9:
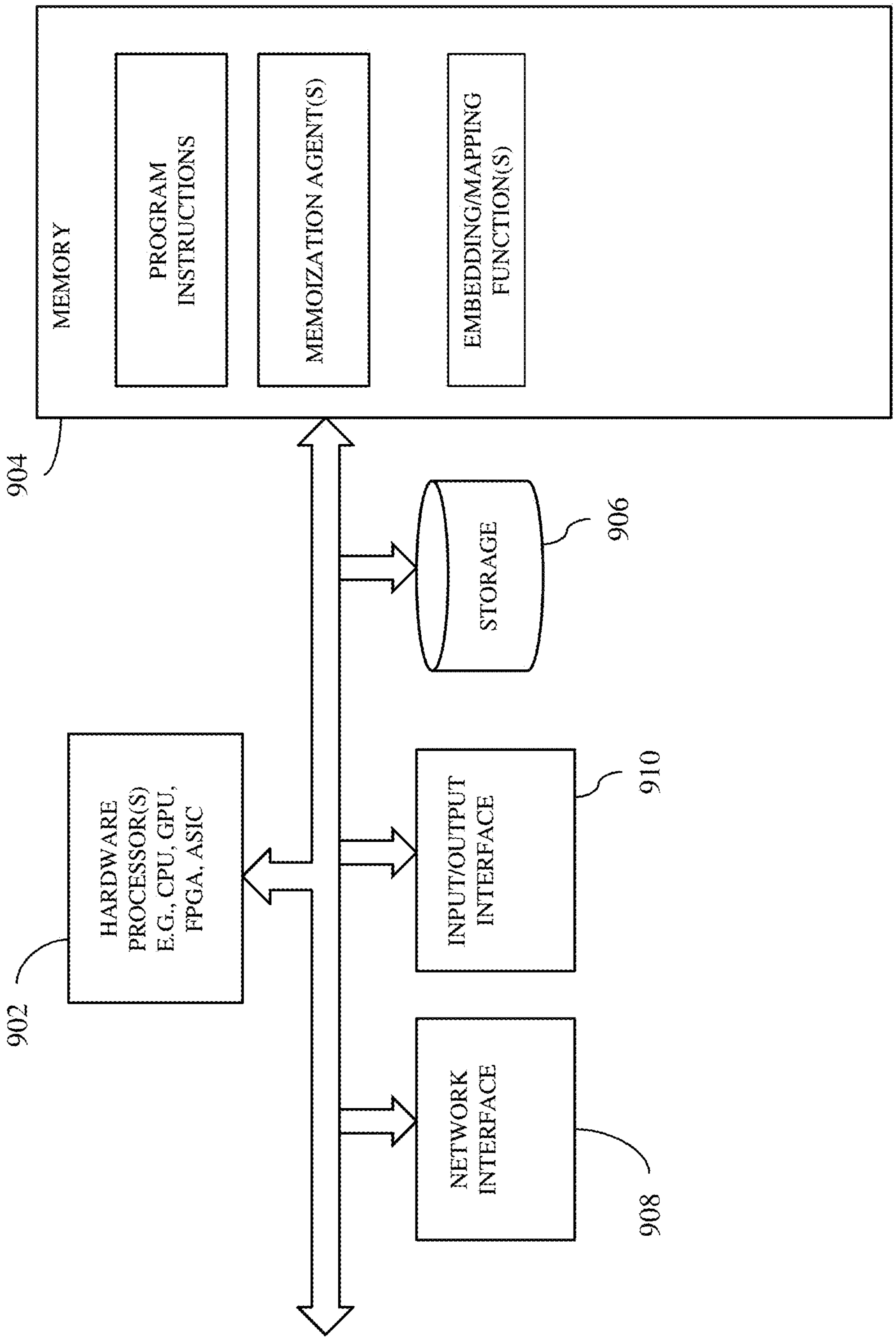
FIG. 9 is a diagram showing components of a system that can perform workflow memoization in an embodiment.

FIG. 9 is a diagram showing components of a system that can perform memoization described herein in an embodiment. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and generate an embedding for a node, find matching embedding and retrieve output and/or intermediary files associated with the matching embedding. Such output can be used in lieu of running the node, in downstream process or processes, for example, which depend on the node's output. A memory device 904 may include random access memory (RAM), read-only memory (ROM) or another memory device, and may store data and/or processor instructions for implementing various functionalities associated with the methods and/or systems described herein. One or more processors 902 may execute computer instructions stored in memory 904 or received from another computer device or medium. A memory device 904 may, for example, store instructions and/or data for functioning of one or more hardware processors 902, and may include an operating system and other program of instructions and/or data. In an aspect, data associated with the node, for example, for generating the embedding can be stored in a storage device 906 or received via a network interface 908 from a remote device, and may be temporarily loaded into a memory device 904 for building or generating the embedding. In an aspect, embeddings of nodes and their outputs can also be stored in one or more local and/or remote storage devices. One or more hardware processors 902 may be coupled with interface devices such as a network interface 908 for communicating with remote systems, for example, via a network, and an input/output interface 910 for communicating with input and/or output devices such as a keyboard, mouse, display, and/or others.

Figure 10:
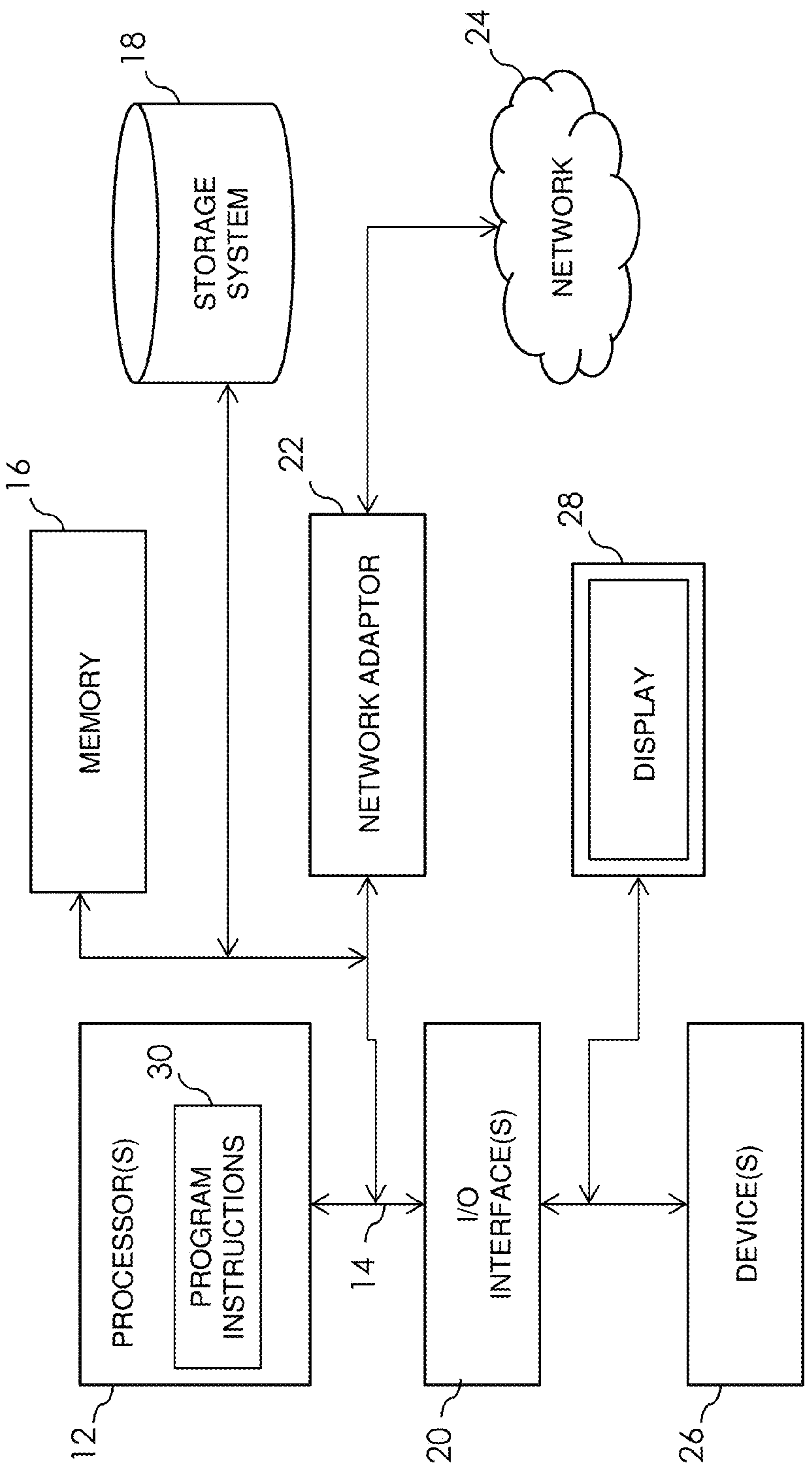
FIG. 10 illustrates a schematic of an example computer or processing system that may implement a workflow memoization according to one embodiment.

FIG. 10 illustrates a schematic of an example computer or processing system that may implement a memoization system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
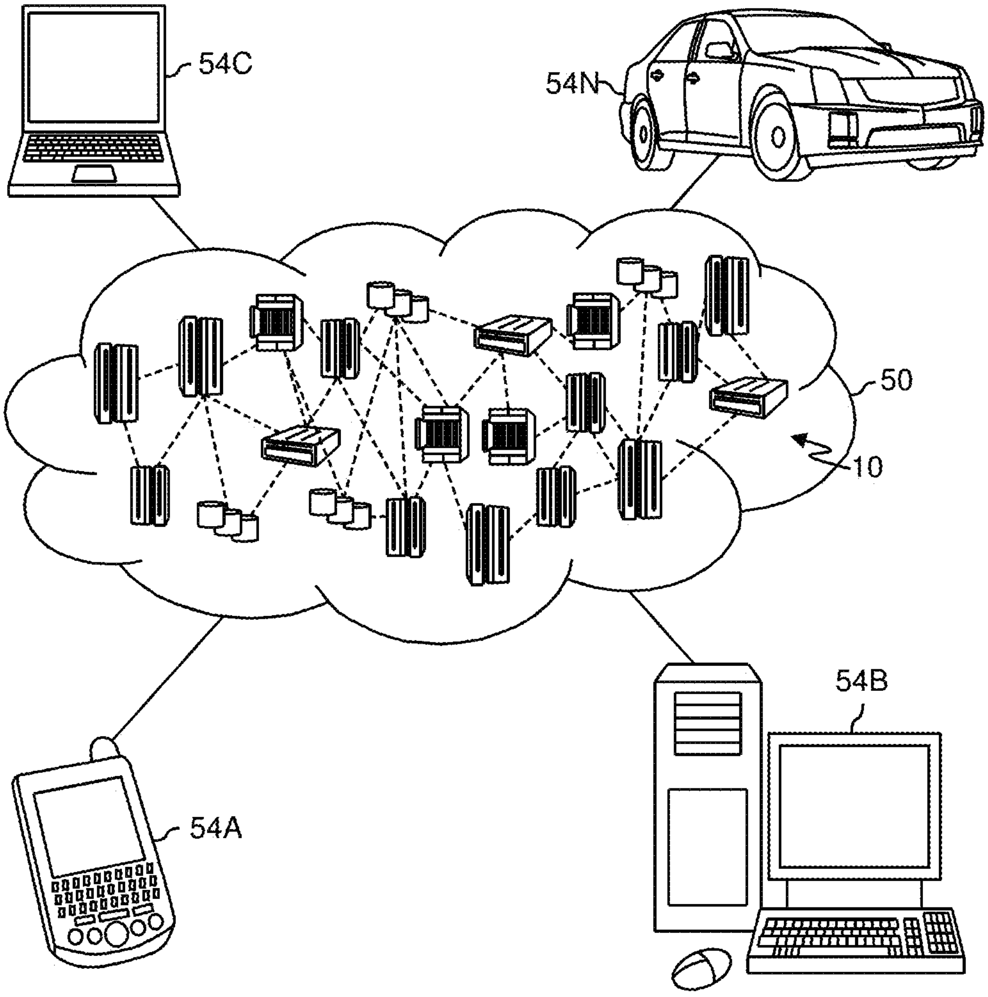
FIG. 11 illustrates a cloud computing environment in one embodiment.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
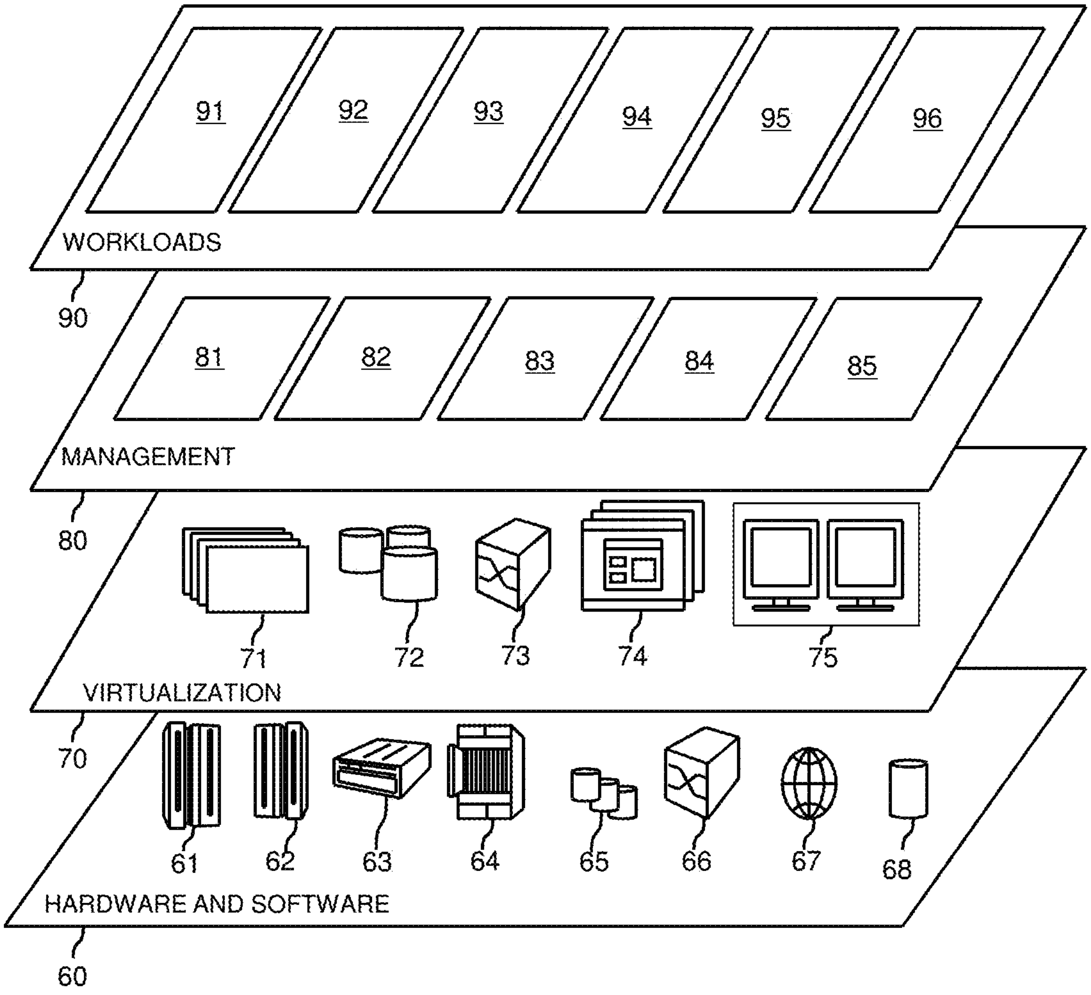
FIG. 12 illustrates a set of functional abstraction layers provided by cloud computing environment in one embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow memoization processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by at least one processor, the method comprising:

generating an embedding associated with a node in a workflow responsive to determining that the node in the workflow is in a ready state to run on the at least one processor, the embedding generated by encoding at least the node's executable and input data to the node, at least some of the input data being arguments to the node's executable that are values used by the node's executable, the embedding being a single bitstring that combines at least the node's executable and the input data to the node, the single bitstring further combining a producer embedding associated with a producer whose output the node consumes, wherein the embedding and the producer embedding are generated using configurable one or more mapping functions;

retrieving from a database of embeddings, a matching embedding that matches the embedding according to a match criterion, the database of embeddings storing embeddings associated with previously run nodes;

retrieving from a storage, output data associated with the matching embedding, the output data for use as the node's output; and using the output data as input to another node in the workflow without running the node in the workflow on the at least one processor, thereby saving resources of the at least one processor by not running the node in the workflow, a configuration associated with the node including an option that indicates whether the embedding that is generated is used in fuzzy matching.

2. The method of claim 1, wherein the output data is retrieved from a storage storing output files and data associated with the embeddings in the database.

3. The method of claim 1, wherein the match criterion includes identical matching.

4. The method of claim 1, wherein the match criterion includes the fuzzy matching based on a configurable similarity threshold.

5. The method of claim 1, wherein the embedding is generated recursively by traversing nodes of the workflow upstream starting from the node and performing encoding at each node visited in the traversing, wherein the embedding associated with the node incorporates encodings of nodes visited in the traversing.

6. The method of claim 1, wherein the embedding includes encoding of the node's metadata with the node's executable and the node's input data.

7. The method of claim 6, wherein the node's metadata includes at least one of container image name, container image hash and environment variables.

8. The method of claim 1, wherein the output data is retrieved from a remote storage.

9. The method of claim 1, wherein the output data is retrieved from a local storage.

10. The method of claim 1, further including authenticating a process that is retrieving the output data for security.

11. The method of claim 1, wherein outputs of multiple cached tasks with matching embeddings are retrieved and filtered based on a filter criterion.

12. The method of claim 1, wherein the output data is further post-processed before using the output data in lieu of running the node.

13. The method of claim 1, wherein the output data is associated with a node from a different workflow different from the workflow.

14. The method of claim 1, wherein the output data includes intermediary files and output files, which the node would create if the node were to be run on the at least one processor.

15. A system comprising:

at least one processor;

a storage device coupled with the at least one processor;

the at least one processor configured to at least:

generate an embedding associated with a node in a workflow responsive to determining that the node in the workflow is in a ready state to run, the embedding generated by encoding at least the node's executable and an input data to the node, at least some of the input data being arguments to the node's executable that are values used by the node's executable, the embedding being a single bitstring that combines at least the node's executable and the input data to the node, the single bitstring further combining a producer embedding associated with a producer whose output the node consumes, wherein the embedding and the producer embedding are generated using configurable one or more mapping functions;

retrieve from a database of embeddings stored in the storage device, a matching embedding that matches the embedding according to a match criterion, the database of embeddings storing embeddings associated with previously run nodes;

retrieve from a storage, output data associated with the matching embedding, the output data for use as the node's output; and using the output data as input to another node in the workflow without running the node in the workflow, thereby saving resources of the at least one processor by not running the node in the workflow, a configuration associated with the node including an option that indicates whether the embedding that is generated is used in fuzzy matching.

16. The system of claim 15, wherein the match criterion includes identical matching.

17. The system of claim 15, wherein the match criterion includes the fuzzy matching based on a configurable similarity threshold.

18. The system of claim 15, wherein the embedding is generated recursively by traversing nodes of the workflow upstream starting from the node and performing encoding at each node visited in the traversing, wherein the embedding associated with the node incorporates encodings of nodes visited in the traversing.

19. The system of claim 15, wherein the embedding includes encoding of the node's metadata with the node's executable and the node's input data.

20. The system of claim 19, wherein the node's metadata includes at least one of container image name, container image hash and environment variables.

21. The system of claim 15, further including authenticating a process that is retrieving the output data for security.

22. The system of claim 15, wherein multiple matching embeddings are retrieved and filtered based on a filter criterion.

23. The system of claim 15, wherein outputs of multiple cached tasks with matching embeddings are retrieved and outputs associated with the multiple matching embeddings are post-processed to generate the output data before using the output data in lieu of running the node.

24. A computer program product comprising a computer readable storage medium having program instructions embodied therewith, the program instructions readable by at least one processor to cause the at least one processor to:

generate an embedding associated with a node in a workflow responsive to determining that the node in the workflow is in a ready state to run on the at least one processor, the embedding generated by encoding at least the node's executable and an input data to the node, at least some of the input data being arguments to the node's executable that are values used by the node's executable, the embedding being a single bitstring that combines at least the node's executable and the input data to the node, the single bitstring further combining a producer embedding associated with a producer whose output the node consumes, wherein the embedding and the producer embedding are generated using configurable one or more mapping functions;

retrieve from a database of embeddings stored in a storage device, a matching embedding that matches the embedding according to a match criterion, the database of embeddings storing embeddings associated with previously run nodes;

retrieve from a storage, output data associated with the matching embedding, the output data for use as the node's output; and using the output data as input to another node in the workflow without running the node in the workflow on the at least one processor, thereby saving resources of the at least one processor by not running the node in the workflow, a configuration associated with the node including an option that indicates whether the embedding that is generated is used in fuzzy matching.

25. A computer-implemented method performed by at least one processor, the method comprising:

generating a memoization embedding associated with a node in a workflow responsive to determining that the node in the workflow is in a ready state to run on the at least one processor, the memoization embedding being a single bitstring that combines at least a container image name, container image hash, and environment variables associated with the node and input data to the node, at least some of the input data being arguments to the node's executable that are values used by the node's executable, the single bitstring further combining a producer embedding associated with a producer whose output the node consumes, wherein the memoization embedding and the producer embedding are generated using configurable one or more mapping functions;

retrieving from a database of embeddings, a matching embedding that matches the memoization embedding according to a match criterion, the database of embeddings storing embeddings associated with previously run nodes;

retrieving from a storage, output data associated with the matching embedding, the output data for use as the node's output, the output data including at least output that would be produced if the node in the workflow were to be run on the at least one processor and intermediary data the node in the workflow would create in producing the output if the node in the workflow were to be run on the processor; and using the output data as input to another process in the workflow without running the node in the workflow on the at least one processor, thereby saving resources of the at least one processor by not running the node in the workflow, a configuration associated with the node including an option that indicates whether the embedding that is generated is used in fuzzy matching.

* * * * *